United States Patent
Oguchi et al.

(10) Patent No.: US 12,085,389 B2
(45) Date of Patent: Sep. 10, 2024

(54) ABSOLUTE COORDINATE ACQUISITION METHOD

(71) Applicant: NIPPON TELEGRAPH AND TELEPHONE CORPORATION, Tokyo (JP)

(72) Inventors: Suguru Oguchi, Tokyo (JP); Yoshihiro Iriyama, Tokyo (JP); Kenji Hiyoshi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 455 days.

(21) Appl. No.: 17/619,845

(22) PCT Filed: Jun. 18, 2019

(86) PCT No.: PCT/JP2019/024143
§ 371 (c)(1),
(2) Date: Dec. 16, 2021

(87) PCT Pub. No.: WO2020/255266
PCT Pub. Date: Dec. 24, 2020

(65) Prior Publication Data
US 2022/0349710 A1   Nov. 3, 2022

(51) Int. Cl.
*G01C 15/02*   (2006.01)
*G01C 11/06*   (2006.01)

(52) U.S. Cl.
CPC .............. *G01C 15/02* (2013.01); *G01C 11/06* (2013.01)

(58) Field of Classification Search
CPC ......... G01C 15/02; G01C 15/06; G01C 11/06
(Continued)

(56) References Cited

U.S. PATENT DOCUMENTS

| 4,820,041 A * | 4/1989 | Davidson | G01S 5/16 |
| | | | 33/294 |
| 8,319,687 B2 * | 11/2012 | Kahle | G01S 13/878 |
| | | | 342/463 |

(Continued)

FOREIGN PATENT DOCUMENTS

| JP | 10850180 A | 2/1996 |
| JP | 200591298 A | 4/2005 |

(Continued)

OTHER PUBLICATIONS

Seminar (2007) "High-precision location information Positioning Application to road maintenance field" Kensetsu Denki Gijyutsu, vol. 156, pp. 20-21.

(Continued)

*Primary Examiner* — George B Bennett

(57) ABSTRACT

An absolute coordinate acquisition method is an absolute coordinate acquisition method for acquiring absolute coordinates of an underground pipeline, the method including: a marking step S101 of setting a plurality of reference points on a road surface and setting a measurement point on a pipeline installed inside an excavated ditch; a measurement step S102 of measuring absolute coordinates of the reference points; a relative position calculation step (S103 to S105) of calculating relative positions of the reference points and the measurement point to a reference position; and an absolute coordinate calculation step S106 of calculating absolute coordinates of the measurement point based on the absolute coordinates of the reference points and the relative positions of the reference points and the measurement point.

11 Claims, 7 Drawing Sheets

(58) Field of Classification Search
USPC .......................................................... 33/293
See application file for complete search history.

(56) References Cited

U.S. PATENT DOCUMENTS

| | | | | |
|---|---|---|---|---|
| 9,547,935 B2* | 1/2017 | Haglund | ................ | G06T 7/593 |
| 10,264,221 B2* | 4/2019 | Kumagai | ............. | G01C 15/002 |
| 11,341,673 B2* | 5/2022 | Takeuchi | ............. | G01C 15/002 |
| 11,592,291 B2* | 2/2023 | Sasaki | .................... | G01C 15/06 |
| 11,808,571 B2* | 11/2023 | Shimizu | ................. | G01C 15/06 |
| 2021/0295540 A1* | 9/2021 | Sato | ....................... | G06T 7/292 |
| 2022/0003549 A1* | 1/2022 | Honoki | ................. | G01C 15/02 |
| 2022/0268660 A1* | 8/2022 | Shintaku | ............. | G01M 3/2807 |
| 2022/0413119 A1* | 12/2022 | Starr | ...................... | G01S 17/06 |
| 2023/0273022 A1* | 8/2023 | Yoshimura | ............. | G01C 15/02 |

FOREIGN PATENT DOCUMENTS

| | | | |
|---|---|---|---|
| JP | 2009270904 A | | 11/2009 |
| WO | 2005040721 A1 | | 5/2005 |

OTHER PUBLICATIONS

Ministry of Land, Infrastructure, Transport and Tourism National Institute for Land and Infrastructure Management (2014) "Guide to finished product management technology by total station [for orderers]" [online] website: https://www.kkr.mlit.go.jp/kingi/ict/h2603-02.pdf.

* cited by examiner

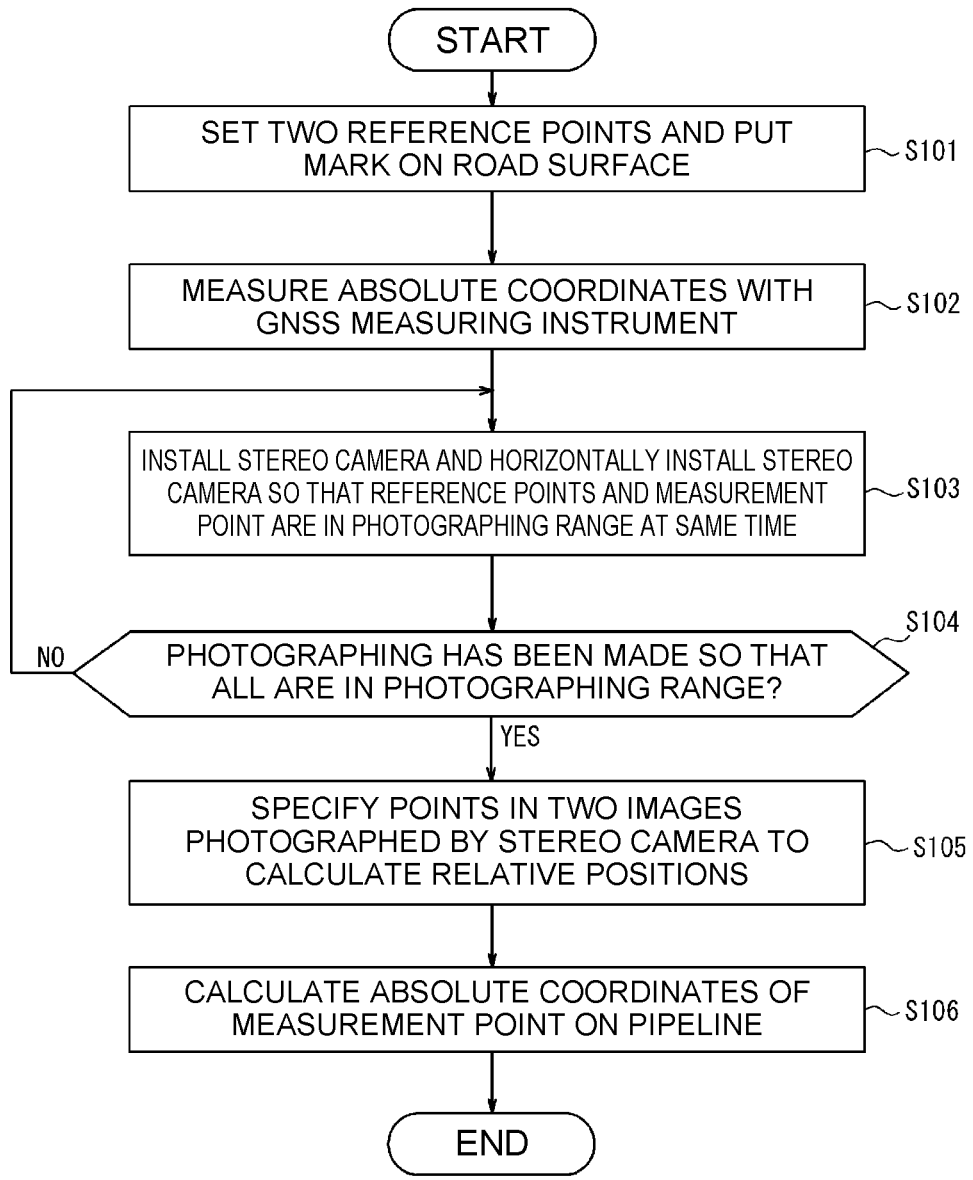

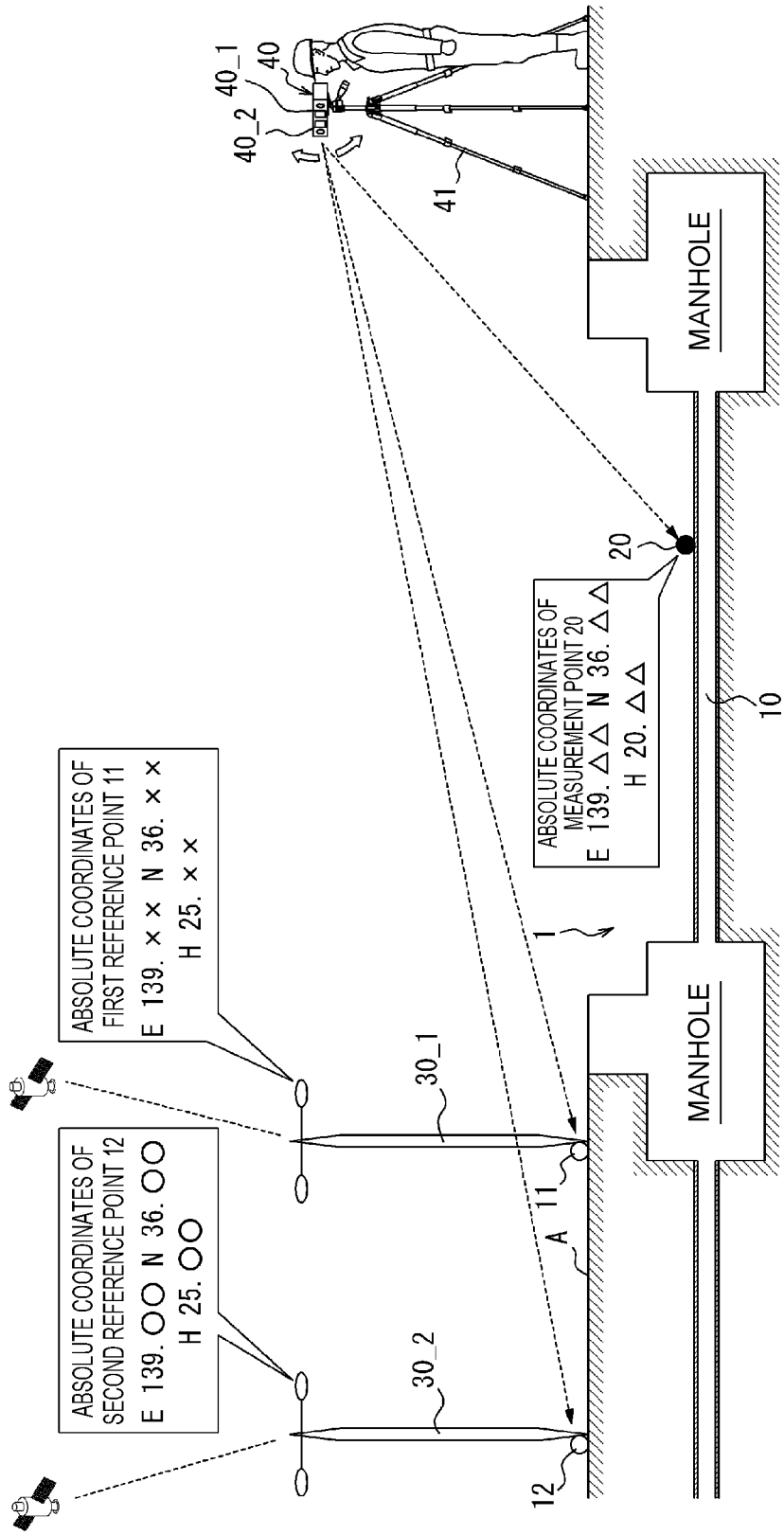

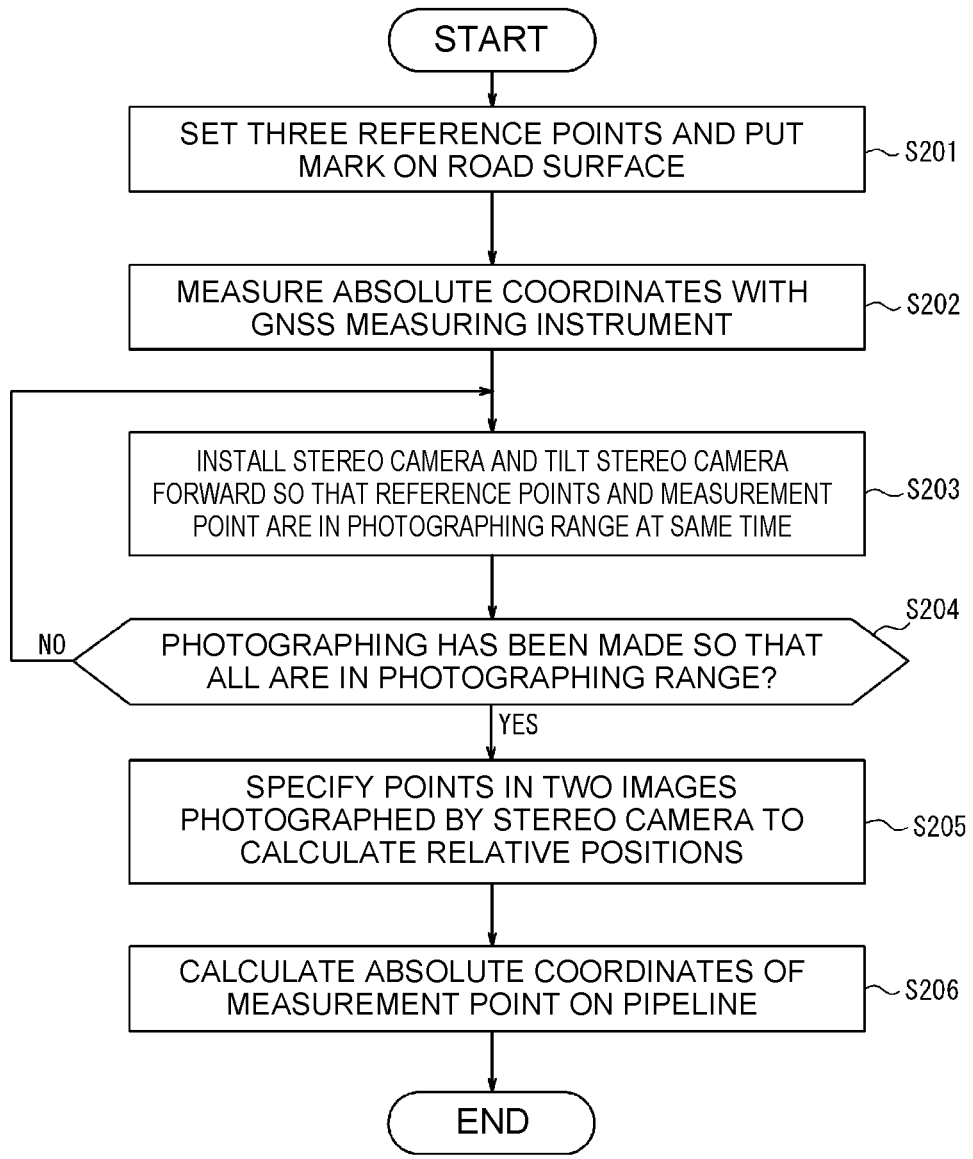

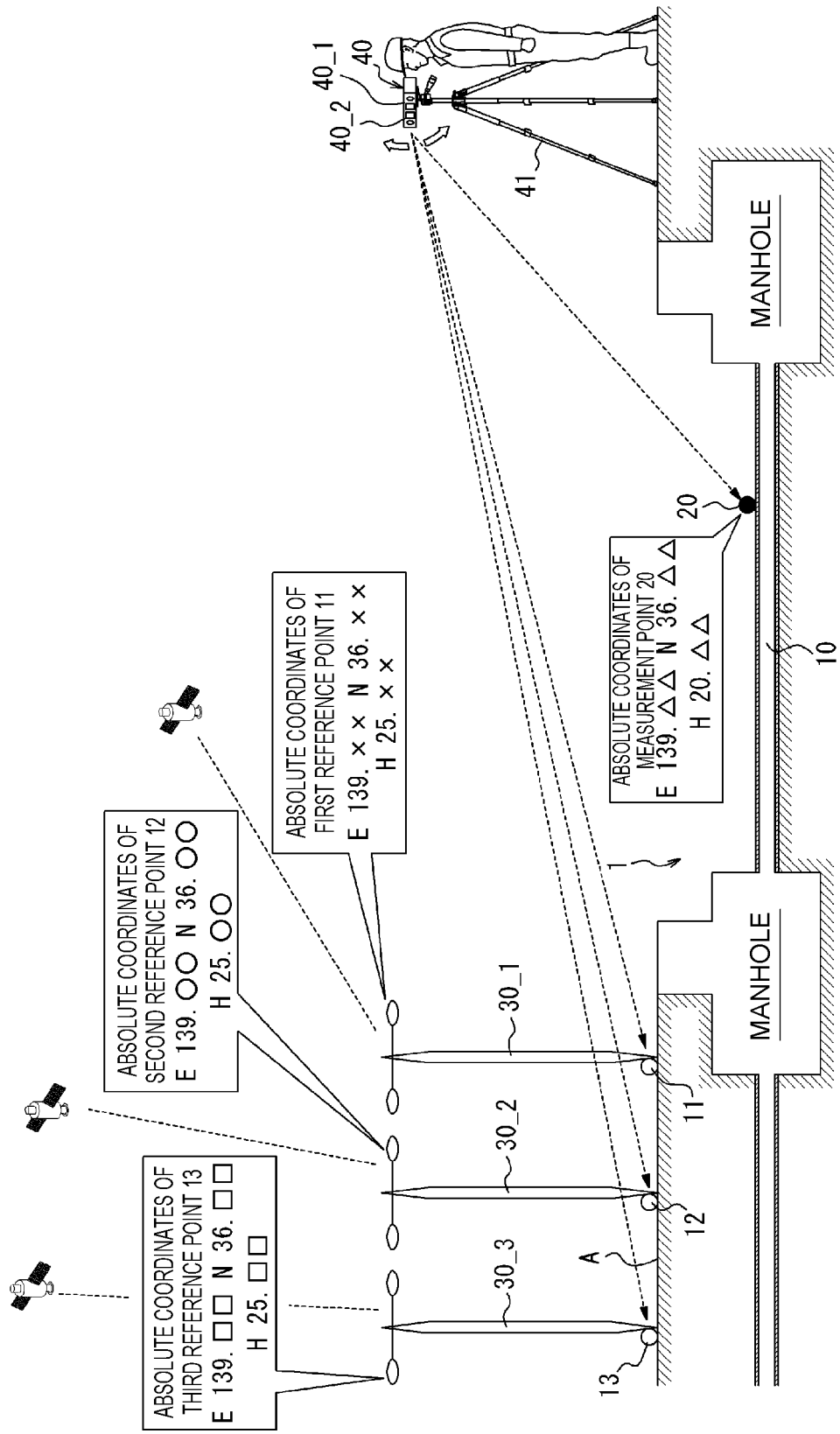

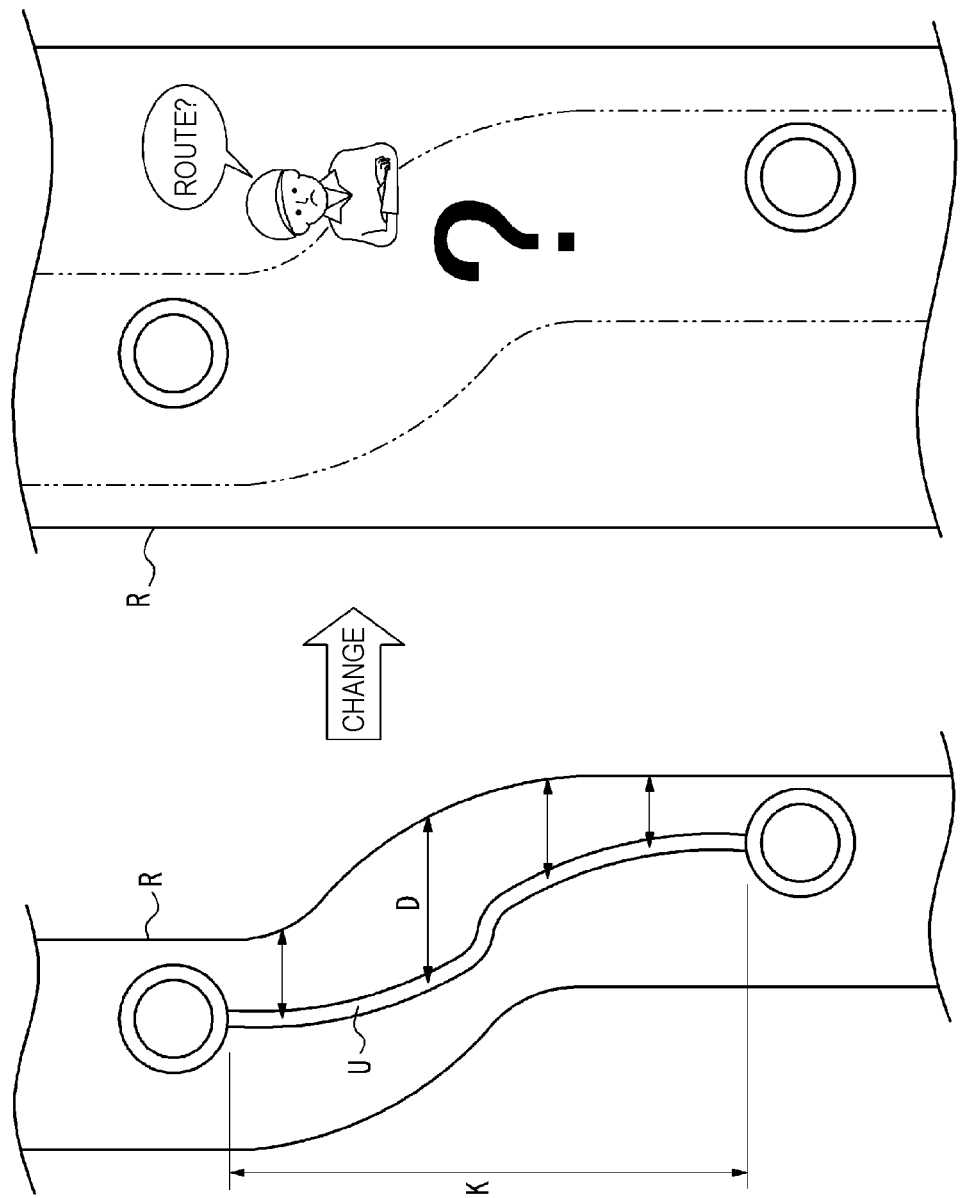

ABSOLUTE COORDINATE ACQUISITION METHOD

CROSS-REFERENCE TO RELATED APPLICATIONS

This application is a U.S. National Stage Application filed under 35 U.S.C. § 371 claiming priority to International Patent Application No. PCT/JP2019/024143, filed on 18 Jun. 2019, the disclosure of which is hereby incorporated herein by reference in its entirety.

TECHNICAL FIELD

The present invention relates to an absolute coordinate acquisition method for an underground pipeline.

BACKGROUND ART

There has been a need for accurately specifying installation positions of road facilities, rivers and port facilities, underground installations such as water supply and sewerage, and the like, and efficiently performing the maintenance and management of the facilities (e.g., see Non-Patent Literature 1). In coordinate measurement for these facilities, the horizontal installation of measurement equipment has been prescribed (e.g., see Non-Patent Literature 2).

Conventionally, as shown in FIG. 5A, an operator has grasped a route K of an underground pipeline U based on a distance D between a road alignment R and the underground pipeline U and has carried out the maintenance and management of the underground pipeline U. However, in the method for measuring the relative position of the underground pipeline U to the road alignment R, when the road alignment R is changed, it is difficult for the operator to grasp the route K of the underground pipeline U. Therefore, in recent years, as shown in FIG. 5B, the operator grasps the route K of the underground pipeline U based on absolute coordinates X of the underground pipeline U and efficiently carries out the maintenance and management of the underground pipeline U. In the method for measuring the absolute coordinates X of the underground pipeline U by the Global Positioning System (GPS) or the like, even when the road alignment R is changed, the operator can accurately grasp the route K of the underground pipeline U. For example, as shown in FIG. 6, the operator enters an excavated ditch S with equipment, installs equipment such as a global navigation satellite system (GNSS) measuring instrument G, and acquires the absolute coordinates X of the underground pipeline U.

CITATION LIST

Non-Patent Literature

Non-Patent Literature 1: "Application of High-precision Positional Information Measurement to Road Maintenance Field," Kensetsu Denki Gijyutsu, Vol. 156, 2007.1

Non-Patent Literature 2: "Guide to Work Progress Control Technology Using Total Station" (Ministry of Land, Infrastructure, Transport and Tourism), [online], [Retrieved Jun. 7, 2019], Internet <https://www.kkr.m-lit.go.jp/kingi/ict/h2603-02.pdf>

SUMMARY OF THE INVENTION

Technical Problem

However, there is a problem in that it is not only dangerous for the operator but also difficult to carry out highly precise measurement when the operator enters the excavated ditch with equipment and installs the equipment to acquire the absolute coordinates of the underground pipeline.

An object of the present invention, which has been made in view of such circumstances, is to provide an absolute coordinate acquisition method by which an operator can accurately grasp a position of an underground pipeline without entering an excavation structure with equipment.

Means for Solving the Problem

For solving the above problem, an absolute coordinate acquisition method according to the present invention is an absolute coordinate acquisition method for acquiring absolute coordinates of an underground pipeline, the method including: a marking step of setting a plurality of reference points on a road surface and setting a measurement point on a pipeline installed inside an excavated ditch; a measurement step of measuring absolute coordinates of the reference points; a relative position calculation step of calculating relative positions of the reference points and the measurement point to a reference position; and an absolute coordinate calculation step of calculating absolute coordinates of the measurement point based on the absolute coordinates of the reference points and the relative positions of the reference points and the measurement point.

Effects of the Invention

According to the present invention, it is possible for an operator to accurately grasp a position of an underground pipeline without entering an excavation structure with equipment.

BRIEF DESCRIPTION OF DRAWINGS

FIG. 1 is a flowchart showing an example of an absolute coordinate acquisition method according to a first embodiment.

FIG. 2 is a diagram for explaining an example of the absolute coordinate acquisition method according to the first embodiment.

FIG. 3 is a flowchart showing an example of an absolute coordinate acquisition method according to a second embodiment.

FIG. 4 is a diagram for explaining an example of the absolute coordinate acquisition method according to the second embodiment.

FIG. 5A is a diagram for explaining a conventional management method for an underground pipeline facility.

DESCRIPTION OF EMBODIMENTS

Figure 5B:
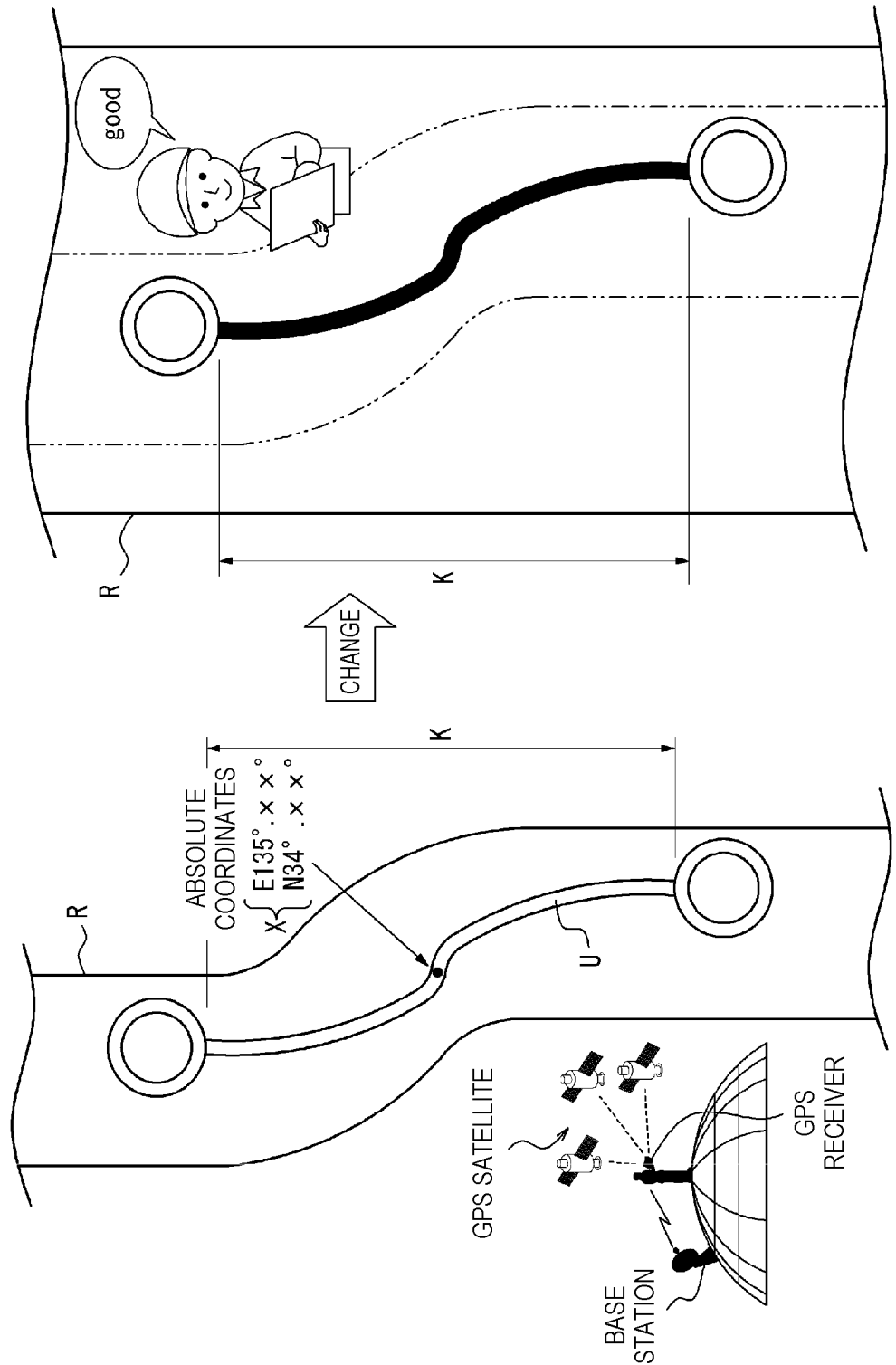
FIG. 5B is a diagram for explaining a conventional management method for an underground pipeline facility.
Figure 6:
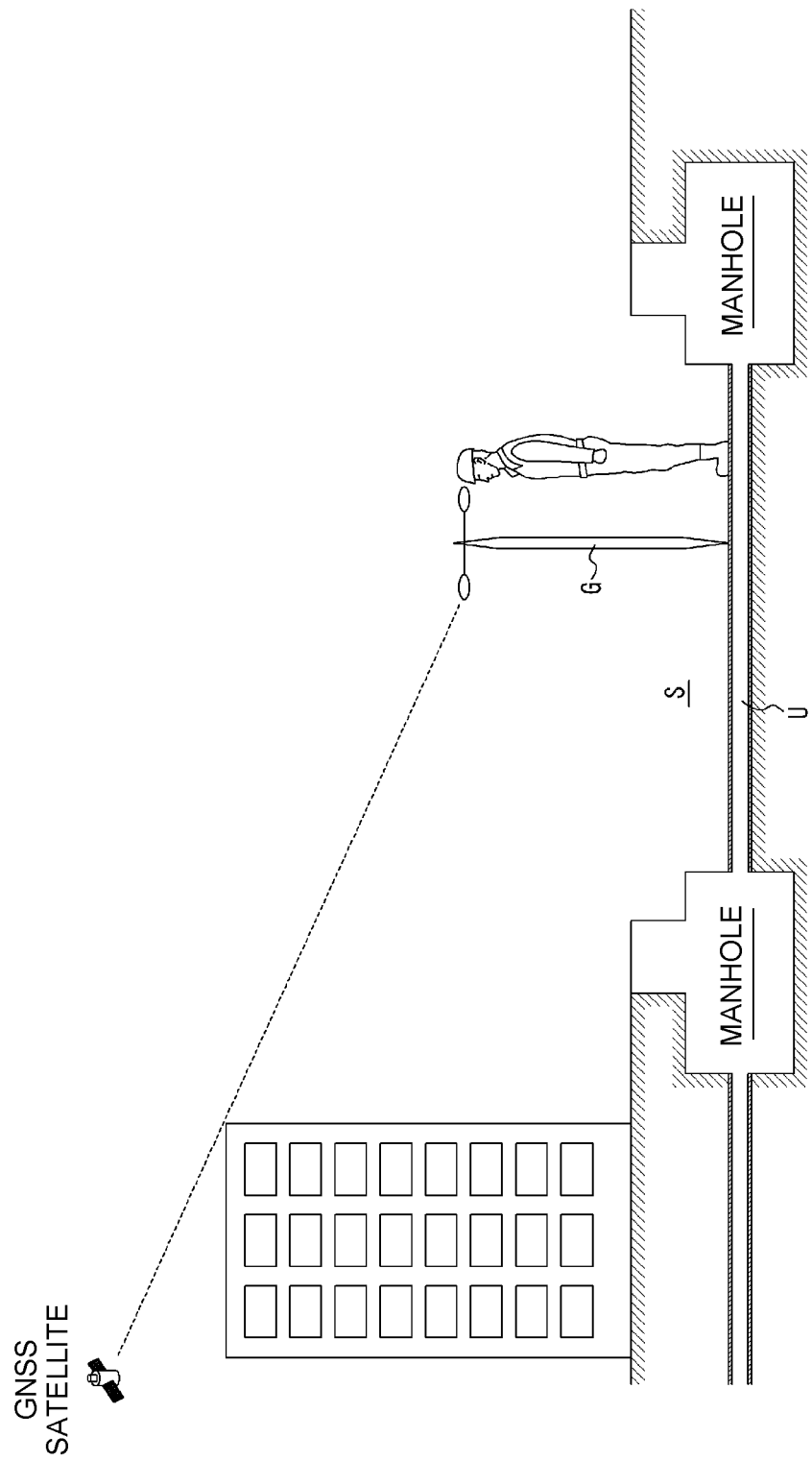
FIG. 6 is a diagram for explaining an example of a conventional absolute coordinate acquisition method.

Hereinafter, an embodiment of the present invention will be described in detail with reference to the drawings.

First Embodiment

An absolute coordinate acquisition method according to the present embodiment will be described with reference to FIGS. 1 and 2. An operator acquires absolute coordinates of an underground pipeline by using, for example, a GNSS measuring instrument 30, a stereo camera 40, a calculation device (not shown), and the like.

The GNSS measuring instrument 30 measures absolute coordinates (e.g., east longitude E○○°, north latitude N○○°, height H○○°, etc.) of an object by using a satellite positioning system that determines a present position on the ground with an artificial satellite. GNSS is a generic name of satellite positioning systems including GPS (U.S.), the Quasi-Zenith Satellite System, GLONASS (Russia), Galileo (under planning in EU), and the like.

The stereo camera 40 measures the relative position of the object to a reference position based on a parallax indicating the difference between a position of an image of the object included in a first image and a position of an image of the object included in a second image. The first image is an image photographed by a first camera 40_1 installed on the left side of the operator. The second image is an image photographed by a second camera 40_2 installed on the right side of the operator. The reference position is, for example, the position of the optical center of the stereo camera 40. The stereo camera 40 is fixed by a tripod 41, for example.

step S101: The operator sets two reference points (first reference point 11 and second reference point 12) on a road surface A. The operator then sets a measurement point 20 on a pipeline 10 installed inside an excavated ditch 1. The operator marks the measurement point 20 with, for example, a mark having a white cross shape on a red felt fabric that does not reflect light.

step S102: The operator installs the GNSS measuring instrument 30 on the road surface A. The GNSS measuring instrument 30 measures the absolute coordinates of the first reference point 11 and the second reference point 12. A GNSS measuring instrument 30_1 measures the absolute coordinates of the first reference point 11 to be, for example, east longitude E139.xx°, north latitude N36.xx°, and height H25.xx°. A GNSS measuring instrument 30_2 measures the absolute coordinates of the second reference point 12 to be, for example, east longitude E139.○○°, north latitude N36.○○°, and height H25.○○°. Note that the operator may arbitrarily determine the positions of the two reference points in consideration of the photographing range of the stereo camera 40, and the like.

step S103: The operator installs the stereo camera 40 on the road surface A. Then, the operator horizontally installs the stereo camera 40 so that the first reference point 11, the second reference point 12, and the measurement point 20 are in the photographing range of the stereo camera 40.

step S104: The stereo camera 40 photographs the first reference point 11, the second reference point 12, and the measurement point 20. The operator determines whether the photographing has been made so that the first image photographed by the first camera 40_1 and the second image photographed by the second camera 40_2 each include the first reference point 11, the second reference point 12, and the measurement point 20. That is, the operator determines whether the two images (first image and second image) photographed by the first camera 40_1 and the second camera 40_2 each include the first reference point 11, the second reference point 12, and the measurement point 20.

When the operator determines that the two images photographed by the first camera 40_1 and the second camera 40_2 each include the first reference point 11, the second reference point 12, and the measurement point 20 (step S104→YES), the process proceeds to step S105. When the operator determines that the two images photographed by the first camera 40_1 and the second camera 40_2 do not each include the first reference point 11, the second reference point 12, or the measurement point 20 (step S104→NO), the process proceeds to step S103.

step S105: The calculation device calculates, based on the two images photographed by the first camera 40_1 and the second camera 40_2, the relative position of the first reference point 11 to the reference position, the relative position of the second reference point 12 to the reference position, and the relative position of the measurement point 20 to the reference position.

Specifically, the calculation device calculates the difference between the position of the image of the first reference point 11 included in the first image photographed by the first camera 40_1 and the position of the image of the first reference point 11 included in the second image photographed by the second camera 40_2. The calculation device calculates the difference between the position of the image of the second reference point 12 included in the first image photographed by the first camera 40_1 and the position of the image of the second reference point 12 included in the second image photographed by the second camera 40_2. The calculation device calculates the difference between the position of the image of the measurement point 20 included in the first image photographed by the first camera 40_1 and the position of the image of the measurement point 20 included in the second image photographed by the second camera 40_2.

Then, the calculation device calculates the distance between the stereo camera 40 and the first reference point 11 based on the difference between the position of the image of the first reference point 11 included in the first image and the position of the image of the first reference point 11 included in the second image. The calculation device calculates the distance between the stereo camera 40 and the second reference point 12 based on the difference between the position of the image of the second reference point 12 included in the first image and the position of the image of the second reference point 12 included in the second image. The calculation device calculates the distance between the stereo camera 40 and the measurement point 20 based on the difference between the position of the image of the measurement point 20 included in the first image and the position of the image of the measurement point 20 included in the second image.

Then, the calculation device calculates the relative position of the first reference point 11 to the reference position based on the distance between the stereo camera 40 and the first reference point 11. The calculation device calculates the relative position of the second reference point 12 to the reference position based on the distance between the stereo camera 40 and the second reference point 12. The calculation device calculates the relative position of the measurement point 20 to the reference position based on the distance between the stereo camera 40 and the measurement point 20.

step S106: The calculation device calculates the absolute coordinates of the measurement point 20 based on the absolute coordinates of the first reference point 11, the absolute coordinates of the second reference point 12, the relative position of the first reference point 11 to the reference position, the relative position of the second reference point 12 to the reference position, and the relative position of the measurement point 20 to the reference position. The calculation device calculates the absolute coordinates of the measurement point 20 to be, for example, east longitude E139.ΔΔ°, north latitude N36.ΔΔ°, and height H20.ΔΔ°.

As described above, by setting two reference points on the road surface A, the operator installs the GNSS measuring instrument 30 on the road surface A to acquire the absolute coordinates of the two reference points without entering the excavated ditch 1. Thus, the operator can acquire the absolute coordinates of the two reference points with high precision without causing trouble such as that a measuring rod of the GNSS measuring instrument 30 does not come out to the ground or that it takes time for the operator to enter the excavated ditch 1 with the GNSS measuring instrument 30. Further, by the calculation device using the absolute coordinates of these reference points to calculate the absolute coordinates of the measurement points, the operator can acquire the absolute coordinates of the measurement points with high precision.

The absolute coordinate acquisition method according to the first embodiment enables the operator to accurately grasp the position of the underground pipeline without entering the excavation structure with equipment.

Second Embodiment

An absolute coordinate acquisition method according to the present embodiment will be described with reference to FIGS. 3 and 4.

The absolute coordinate acquisition method according to the second embodiment differs from the absolute coordinate acquisition method according to the first embodiment as follows. In the absolute coordinate acquisition method according to the first embodiment, the operator sets two reference points of the first reference point 11 and the second reference point 12 on the road surface A, while in the absolute coordinate acquisition method according to the second embodiment, the operator sets three reference points of a first reference point 11, a second reference point 12, and a third reference point 13 on a road surface A. The other steps are the same between the absolute coordinate acquisition method according to the first embodiment and the absolute coordinate acquisition method according to the second embodiment, and hence the redundant description will be omitted.

step S201: The operator sets three reference points (first reference point 11, second reference point 12, and third reference point 13) on the road surface A. The operator then sets a measurement point 20 on a pipeline 10 installed inside an excavated ditch 1. The operator marks the measurement point 20 with, for example, a mark having a white cross shape on a red felt fabric that does not reflect light.

step S202: The operator installs a GNSS measuring instrument 30 on the road surface A. The GNSS measuring instrument 30 measures the absolute coordinates of the first reference point 11, the second reference point 12, and the third reference point 13. A GNSS measuring instrument 30_1 measures the absolute coordinates of the first reference point 11 to be, for example, east longitude E139.xx°, north latitude N36.xx°, and height H25.xx°. A GNSS measuring instrument 30_2 measures the absolute coordinates of the second reference point 12 to be, for example, east longitude E139.◯◯°, north latitude N36.◯◯°, and height H25.◯◯°. A GNSS measuring instrument 30_3 measures the absolute coordinates of the third reference point 13 to be, for example, east longitude E139.□□°, north latitude N36.□□°, and height H25.□□°. Note that the operator may arbitrarily determine the positions of the three reference points in consideration of the photographing range of a stereo camera 40, and the like. The number of reference points set on the road surface A may be three or more.

step S203: The operator installs the stereo camera 40 on the road surface A. Then, the operator tilts the stereo camera 40 forward so that the first reference point 11, the second reference point 12, the third reference point 13, and the measurement point 20 are in the photographing range of the stereo camera 40.

Referring to Non-Patent Literature 2, the horizontal installation of equipment (e.g., stereo camera) has been prescribed in coordinate measurement. However, on an actual site, it may be difficult to install the equipment horizontally on the road surface A having inclination and unevenness. Even in such a case, by setting three or more reference points on the road surface A, the operator can acquire with high precision the relative position of the first reference point 11 to the reference position, the relative position of the second reference point 12 to the reference position, the relative position of the third reference point 13 to the reference position, and the relative position of the measurement point 20 to the reference position. Further, by the calculation device using the relative positions to calculate the absolute coordinates of the measurement points, the operator can acquire the absolute coordinates of the measurement points with high precision.

The steps from step S204 to step S206 are the same as the steps from step S104 to step S106, and hence the redundant description will be omitted.

The absolute coordinate acquisition method according to the second embodiment enables the operator to accurately grasp the position of the underground pipeline without entering the excavation structure with equipment. The method also solves a conventional problem of difficulty in acquiring accurate absolute coordinates in the case of installation of a stereo camera at a position with poor footing and enables the operator to acquire the absolute coordinates of the measurement point with high precision without horizontally installing the stereo camera.

Modifications

In the first embodiment, the case where the operator sets two reference points on the road surface A in step S101 has been described as an example, and in the second embodiment, the case where the operator sets three reference points on the road surface A in step S201 has been described as an example, but the number of reference points set on the road surface A is not particularly limited so long as being more than one.

In the present embodiment, the case where the number of measurement points on the pipeline 10 is only one has been described as an example, but the number of measurement points on the pipeline 10 is not particularly limited but may be one or may be more than one.

In the present embodiment, the calculation device calculates the relative position of the first reference point 11 to the reference position, the relative position of the second reference point 12 to the reference position, the relative position of the third reference point 13 to the reference position, and the relative position of the measurement point 20 to the reference position. Further, the case of calculating the absolute coordinates of the measurement point 20 has been described, but the calculation device may be divided into two or more devices. A stereo camera may have a part of the function of the calculation device.

Although the above embodiments have been described as representative examples, it will be apparent to those skilled in the art that many changes and substitutions can be made within the spirit and scope of the present invention. Therefore, the present invention should not be construed as being limited by the embodiments described above, but various modifications and changes can be made without departing from the scope of the claims. For example, the order of each step described in the flowchart of the embodiment is not limited to the above but may be changed as appropriate. Further, a plurality of steps can be combined into one, or one step can be divided.

REFERENCE SIGNS LIST

1 Excavated ditch
10 Pipeline
11 Reference point
12 Reference point
13 Reference point
20 Measurement point
30 GNSS measuring instrument
40 Stereo camera

The invention claimed is:

1. An absolute coordinate acquisition method for acquiring absolute coordinates of an underground pipeline, the method comprising:
    setting a plurality of reference points on a road surface and setting a measurement point on a pipeline installed inside an excavated ditch;
    measuring absolute coordinates of the reference points;
    calculating relative positions of the reference points and the measurement point to a reference position; and
    calculating absolute coordinates of the measurement point based on the absolute coordinates of the reference points and the relative positions of the reference points and the measurement point.

2. The absolute coordinate acquisition method according to claim 1, wherein the calculating relative positions includes:
    simultaneously photographing a first image including the reference points and the measurement point with a first camera and a second image including the reference points and the measurement point with a second camera by using a stereo camera provided with the first camera and the second camera; and
    calculating the relative positions of the reference points and the measurement point to the stereo camera based on the first image and the second image, with the reference position as a position of the stereo camera.

3. The absolute coordinate acquisition method according to claim 1, wherein the number of the reference points is two.

4. The absolute coordinate acquisition method according to claim 1, wherein the number of the reference points is three or more.

5. The absolute coordinate acquisition method according to claim 1, wherein the measuring absolute coordinates of the reference points includes a use of a global navigation satellite system measuring instrument.

6. The absolute coordinate acquisition method according to claim 1, the method further comprising:
    marking the measurement point including a cross shape in a first color on a felt fabric that does not reflect light in a second color on the pipeline installed inside the excavated ditch.

7. The absolute coordinate acquisition method according to claim 2, wherein the number of the reference points is two.

8. The absolute coordinate acquisition method according to claim 2, wherein the number of the reference points is three or more.

9. The absolute coordinate acquisition method according to claim 2, wherein the first camera is distinct from the second camera.

10. The absolute coordinate acquisition method according to claim 2, wherein each of the plurality of reference points is distinct from one another.

11. The absolute coordinate acquisition method according to claim 2, wherein the first camera is non-horizontal.

* * * * *